United States Patent
Ohtsuki et al.

(10) Patent No.: US 6,734,126 B2
(45) Date of Patent: May 11, 2004

(54) DIELECTRIC CERAMIC COMPOSITION FOR MICROWAVE USE

(75) Inventors: Shugo Ohtsuki, Ibaraki (JP); Takeshi Shimada, Ukyo-ku Kyoto (JP); Kazuhiro Nishikawa, Nagaokakyio (JP); Kazuya Toji, Mishima-gun Osaka (JP); Kazuhiro Kura, Hirakata (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 10/168,689

(22) PCT Filed: May 22, 2001

(86) PCT No.: PCT/JP01/04293

§ 371 (c)(1),
(2), (4) Date: Jul. 25, 2002

(87) PCT Pub. No.: WO02/36519

PCT Pub. Date: May 10, 2002

(65) Prior Publication Data

US 2003/0032546 A1 Feb. 13, 2003

(30) Foreign Application Priority Data

Oct. 30, 2000 (JP) ........................................ 2000-330389

(51) Int. Cl.$^7$ .............................................. C04B 35/47
(52) U.S. Cl. ...................................................... 501/136
(58) Field of Search ......................................... 501/136

(56) References Cited

U.S. PATENT DOCUMENTS 6,025,291 A * 2/2000 Murakawa ................... 501/136
6,503,861 B1 * 1/2003 Murakawa et al. .......... 501/137

FOREIGN PATENT DOCUMENTS

| JP | 11071171 | * | 3/1999 |
| JP | 11106255 | * | 4/1999 |
| JP | 11130528 | * | 5/1999 |
| JP | 11092224 | * | 6/1999 |

OTHER PUBLICATIONS

Patent Abstracts of Japan, vol. 1999, No. 09, Jul. 30, 1999 of JP 11 106285 (Kyocera Corp.), dated Apr. 20, 1999, entitled "Dielectric Ceramic Composition and Its Production".

Patent Abstracts of Japan, vol. 1999, No. 10, Aug. 31, 1999 of JP 11 130528 (Kyocera Corp. dated May 18, 1999, entitled "Dielectric Ceramic Composition . . . Using the Composition".

Patent Abstracts of Japan of JP 11–092224 (NGK Spark Plug Co. Ltd), dated Apr. 6, 1999, entitled "Dielectric Material".

* cited by examiner

*Primary Examiner*—Karl Group
(74) *Attorney, Agent, or Firm*—Dykema Gossett PLLC

(57) ABSTRACT

A dielectric ceramic composition for microwave use having a relative permittivity $\epsilon r$ of 35 to 45, $Qf_0$ value of more than 50,000 GHz (at 7 GHz), and dielectric characteristic of $\tau f = 0 \pm 10$ ppm/° C includes an $La_2O_3 \cdot Al_2O_3 \cdot SrO \cdot TiO_2$ based ceramic composition and a specific quantity of $Ga_2O_3$ to increase the $Qf_0$ value and a specific amount of $Pr_2O_3$ to control the $\tau f$ value.

5 Claims, No Drawings

DIELECTRIC CERAMIC COMPOSITION FOR MICROWAVE USE

TECHNICAL FIELD

The present invention relates to a dielectric ceramic composition for microwave use having a relative permittivity $\epsilon r$ of 35 to 45, $Qf_0$ value of at least 50,000 GHz (at 7 GHz) and a dielectric characteristic of $\tau f = 0 \pm 10$ ppm/° C. employed for microwave communication filters, milliwave communication filters, oscillators, inductor antennas, and frequency adjusting rods etc.

BACKGROUND ART

Dielectric ceramic compositions are widely employed in the high-frequency region such as microwaves and milliwaves in for example dielectric resonators, dielectric substrates for MIC and waveguides. The characteristics that these are required to have are: (1) a large relative permittivity $\epsilon r$ to meet demands for miniaturization, since the wavelength is reduced to $1/\epsilon r^{1/2}$ in a dielectric, (2) low dielectric loss at high frequency i.e. high Q value, and (3) small and stable temperature coefficient $\tau f$ of resonance frequency.

Conventional examples of such a dielectric ceramic composition are La—Ti—Al—O based compositions (see Japan, J. Appl. Phys. 36 (1997) 6814), which have $\epsilon r = 36$, $Qf_0$ value=45,000 GHz, and $\tau f = -2$ ppm/° C., but their $Qf_0$ values are low.

Also, in the case of $Ba(Zn_{1/3}Nb_{2/3})O_3$ based compositions (published in: Electronics/Ceramics September 1993 September page 3), $\epsilon r = 41$, $Qf_0$ value=86,000 GHz, and $\tau f = +31$ ppm/° C., but a dielectric ceramic composition of small $\tau f$ is not obtained.

Recently, $La_2O_3.Al_2O_3.SrO.TiO_2$ based composition or $La_2O_3.Al_2O_3.SrO.TiO_2.CaO$ based composition or composition containing one or two or more of Ce, Nb, Ta, Y, Zr, V, Cr, Mo, W, Co, Ni, Cu, Zn, Sn, Bi, B, or Si in the aforementioned ceramic compositions (see Laid-open Japanese Patent Publication H. 11-130528) has been proposed.

Regarding the dielectric characteristic of these ceramic compositions, they have excellent dielectric characteristics with $\epsilon r$ of more than 30, $Qf_0$ value more than 25,000 GHz (at 1 GHz) and $\tau f$ less than +30 (ppm/° C.), but dielectric ceramic compositions of low $\tau f$ are not obtained. Recently, with increasingly severe demands for miniaturization of portable terminal electronic equipment, materials of even better dielectric performance are being demanded.

DISCLOSURE OF THE INVENTION

In view of the foregoing demands, an object of the present invention is to provide a dielectric ceramic composition for microwave use having a relative permittivity $\epsilon r$ of 35 to 45, $Qf_0$ value of at least 50,000 GHz (at 7 GHz) and a dielectric characteristic of $\tau f = 0 \pm 10$ ppm/° C.

The present invention studied various compositions with the object of obtaining a material capable of being controlled to a relative permittivity $\epsilon r$ of 35 to 45, $Qf_0$ value of at least 50,000 GHz (at 7 GHz) and a dielectric characteristic of $\tau f = 0 \pm 10$ ppm/° C, and, as a result, discovered that, with an $La_2O_3.Al_2O_3.SrO.TiO_2$ based ceramic composition, by adding a specific quantity of $Ga_2O_3$ to the aforesaid ceramic composition, the $Qf_0$ value could be increased, and, by further adding a specific quantity of $Pr_2O_3$, control of the $\tau f$ value became possible, so that a ceramic composition capable of being controlled to a relative permittivity $\epsilon r$ of 35 to 45, $Qf_0$ value of at least 50,000 GHz (at 7 GHz) and a dielectric characteristic of $\tau f = 0 \pm 10$ ppm/° C could be obtained, and thereby perfected the present invention.

Specifically, the present invention consists in a dielectric ceramic composition for microwave use characterized in that the compositional formula is expressed by $aAl_2O_3.bGa_2O_3.cTiO_2.dSrO.eLa_2O_3.fPr_2O_3$, where a, b, c, d, e and f representing the mol ratios satisfy the following values (the case where b and f are simultaneously 0 is excluded).

$a+b+c+d+e+f=1$
$0.079 \leq a \leq 0.167$
$0 \leq b \leq 0.017$
$0.333 \leq c \leq 0.412$
$0.333 \leq d \leq 0.412$
$0.035 \leq e \leq 0.167$
$0 \leq f \leq 0.101$

BEST MODE FOR CARRYING OUT THE INVENTION

The reasons why, in the present invention, if the respective mol ratios of $Al_2O_3$, $Ga_2O_3$, $TiO_2$, SrO, $La_2O_3$ and $Pr_2O_3$ are a, b, c, d, e, f, these mol ratios are respectively restricted to $0.079 \leq a \leq 0.167$, $0 \leq b \leq 0.017$, $0.333 \leq c \leq 0.412$, $0.333 \leq d \leq 0.412$, $0.035 \leq e \leq 0.167$, and $0 \leq f \leq 0.101$ are as follows.

If a is less than 0.079, $\epsilon r$ increases but the $Qf_0$ value is less than 50,000 GHz, but if it exceeds 0.167 mol ratio, $\epsilon r$ is lowered and drops to 35 or lower, which is undesirable.

If b exceeds 0.017 mol ratio, the $Qf_0$ value is lowered, resulting in the $Qf_0$ value dropping below 50,000 GHz, which is undesirable.

If c is less than 0.333 mol ratio, or is lowered, falling to 35 or lower, which is undesirable; if it exceeds 0.412 mol ratio, $\epsilon r$ increases, but the $Qf_0$ value drops below 50,000 GHz, which is undesirable.

If d is less than 0.333 mol ratio, $\epsilon r$ is lowered, falling to 35 or lower, which is undesirable; if it exceeds 0.412 mol ratio, $\epsilon r$ increases, but the $Qf_0$ value drops below 50,000 GHz, which is undesirable.

If e is less than 0.035 mol ratio, $\epsilon r$ is increased, but the $Qf_0$ value drops below 50,000 GHz, which is undesirable; if it exceeds 0.167 mol ratio, $\epsilon r$ is lowered, falling to 35 or lower, which is undesirable.

If f exceeds 0.101 mol ratio, If becomes quite large, becoming 10 ppm/° C. or more, which is undesirable.

EXAMPLES

Example 1

As starting raw-material powders, high purity powder of $Al_2O_3$, $Ga_2O_3$, $TiO_2$, $SrCO_3$, $La_2O_3$ and $Pr_6O_{11}$ were blended as shown in Table 1, calcined for two hours at 1200° C., then pulverized to 1.0 µm then granulated by adding a binder and molded into discs of diameter 12 mm×thickness 25 mm with a molding pressure of 1.5 T/cm². After this, the binder was removed and sintering was performed for four hours at 1500° C. in the atmosphere. The sintered body obtained was then cut to a diameter of 10 mm×thickness 4.5 mm to obtain samples. The samples of the Examples which were obtained were evaluated in regard to dielectric performance by the H&C method using a network analyzer. The results are shown in Table 2.

Comparative Example 1

For comparison, powder of high purity identical with that of Example 1 was blended as shown in Table 1, a molding manufactured, and samples manufactured by obtaining a sintered body. The samples of the Comparative Examples which were obtained were evaluated in regard to dielectric performance by the H&C method using a network analyzer. The results are shown in Table 2.

TABLE 1

| | Composition $aAl_2O_3.bGa_2O_3.cTiO_2.dSrO.eLa_2O_3.fPr_2O_3$ | | | | | |
|---|---|---|---|---|---|---|
| | a | b | c | d | e | f |
| present invention | | | | | | |
| 1 | 0.124 | 0.000 | 0.375 | 0.375 | 0.113 | 0.013 |
| 2 | 0.114 | 0.010 | 0.375 | 0.375 | 0.113 | 0.013 |
| 3 | 0.114 | 0.011 | 0.375 | 0.375 | 0.063 | 0.062 |
| 4 | 0.097 | 0.010 | 0.394 | 0.394 | 0.053 | 0.052 |
| 5 | 0.132 | 0.013 | 0.355 | 0.355 | 0.073 | 0.072 |
| 6 | 0.114 | 0.011 | 0.375 | 0.375 | 0.125 | 0.000 |
| comparative example | | | | | | |
| 7 | 0.067 | 0.004 | 0.429 | 0.429 | 0.028 | 0.043 |
| 8 | 0.180 | 0.009 | 0.310 | 0.310 | 0.172 | 0.019 |
| 9 | 0.103 | 0.021 | 0.375 | 0.375 | 0.113 | 0.013 |
| 10 | 0.150 | 0.008 | 0.342 | 0.342 | 0.047 | 0.111 |
| 11 | 0.125 | 0.000 | 0.375 | 0.375 | 0.125 | 0.000 |

TABLE 2

| | Dielectric characteristic | | |
|---|---|---|---|
| | Relative permittivity $\epsilon r$ | Qf value (GHz) | Temperature coefficient $\tau f$ (ppm/° C.) |
| present invention | | | |
| 1 | 38.3 | 54000 | −3.3 |
| 2 | 38.0 | 72000 | −3.1 |
| 3 | 38.1 | 68000 | +0.5 |
| 4 | 42.0 | 52000 | +0.8 |
| 5 | 35.5 | 80000 | +0.6 |
| 6 | 38.1 | 73000 | −9.0 |
| comparative example | | | |
| 7 | 45.0 | 38000 | +2.3 |
| 8 | 31.0 | 110000 | −8.0 |
| 9 | 38.0 | 29000 | −9.5 |
| 10 | 38.2 | 51000 | +13.2 |
| 11 | 38.3 | 50000 | −15.0 |

INDUSTRIAL APPLICABILITY

According to the present invention, in a $La_2O_3.Al_2O_3.SrO.TiO_2$ based ceramic composition, by adding specific amounts of $Ga_2O_3$ and $Pr_2O_3$, a dielectric ceramic composition for microwave use having relative permittivity $\epsilon r$ of 35 to 45 and $Qf_0$ value of more than 50,000 GHz (at 7 GHz), and dielectric characteristic of $\tau f=0\pm10$ ppm/° C. can be provided; this is a very suitable material for filters for microwave communication, filters for milliwave communication, oscillators, dielectric antennas, and frequency regulating rods etc.

What is claimed is:

1. A dielectric ceramic composition for microwave use wherein the compositional formula is expressed by $aAl_2O_3.bGa_2O_3.cTiO_2.dSrO.eLa_2O_3.fPr_2O_3$ where a, b, C, d, e and f represent the mol ratios and satisfy the following values:

a+b+c+d+e+f=1
$0.079 \leq a \leq 0.167$
$0 < b \leq 0.017$
$0.333 \leq c \leq 0.412$
$0.333 \leq d \leq 0.412$
$0.035 \leq e \leq 0.167$
$0 \leq f \leq 0.101$.

2. A dielectric ceramic corn position according to claim 1, wherein $0.010 \leq b \leq 0.017$.

3. A dielectric composition according to claim 1, wherein $0 < f \leq 0.101$.

4. A dielectric composition according to claim 3, wherein $0.013 \leq f \leq 0.101$.

5. A dielectric composition according to claim 4, wherein said composition has a relative permittivity, $\epsilon r$, of 35 to 45, a $Qf_0$ value of at least 50,000 GHz at 7 Ghz, and a dielectric characteristic of $\tau f=0\pm10$ ppm/° C.

* * * * *